United States Patent [19]

Fuchs et al.

[11] 3,770,540
[45] Nov. 6, 1973

[54] METHOD OF SPLICING TWO LAMINATED PACKAGING MATERIALS TOGETHER

[75] Inventors: Alfred Fuchs; Bo E. Gafvert, both of Lund, Sweden

[73] Assignee: AB Tetra PAK, Lund, Sweden

[22] Filed: Jan. 12, 1970

[21] Appl. No.: 7,440

Related U.S. Application Data

[62] Division of Ser. No. 625,673, March 24, 1967, abandoned.

[30] Foreign Application Priority Data

Apr. 12, 1966 Sweden.............................. 4883/66

[52] U.S. Cl................. 156/157, 138/156, 156/229, 156/250, 156/304, 156/502, 220/75
[51] Int. Cl....... B31f 5/00, B29c 27/00, B65d 7/34
[58] Field of Search................... 156/157, 159, 229, 156/304, 502, 510, 250; 161/145; 220/75–76; 138/156, 170

[56] References Cited
UNITED STATES PATENTS 3,486,964   12/1969   Brunlid........................... 156/157 X
3,449,186   6/1969    Rano................................ 156/159

Primary Examiner—Philip Dier
Attorney—Norman C. Armitage et al.

[57] ABSTRACT

Method and apparatus to splice laminated packaging material which has at least one thermoplastic layer. The packaging material is torn so that one of the layers is severed and the thermoplastic layer is stretched so that it projects beyond the severed layer and will readily heat seal to another laminated strip which has a thermoplastic layer.

1 Claim, 6 Drawing Figures

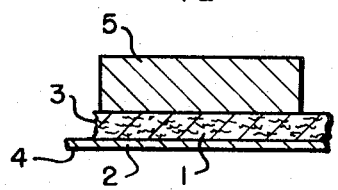
FIG. 1a
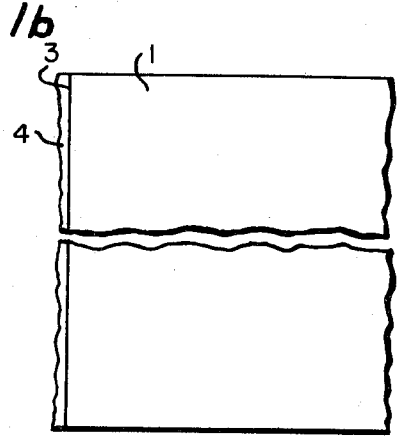
FIG. 1b
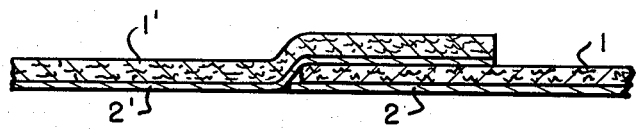
FIG. 1c
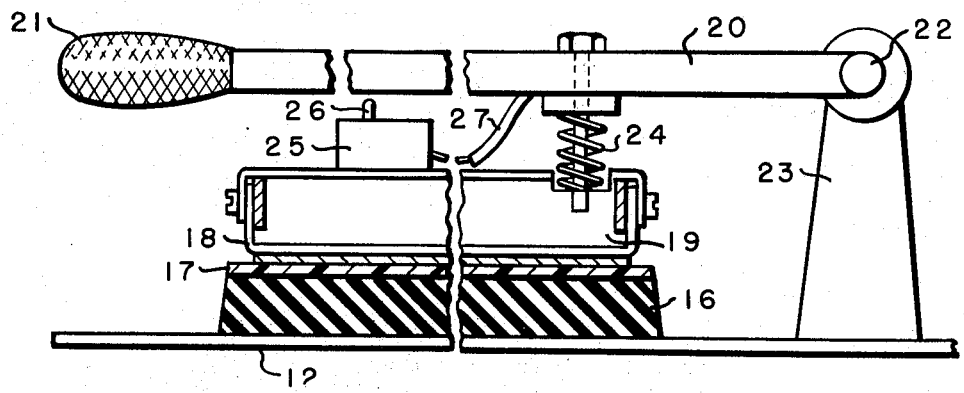
FIG. -4-

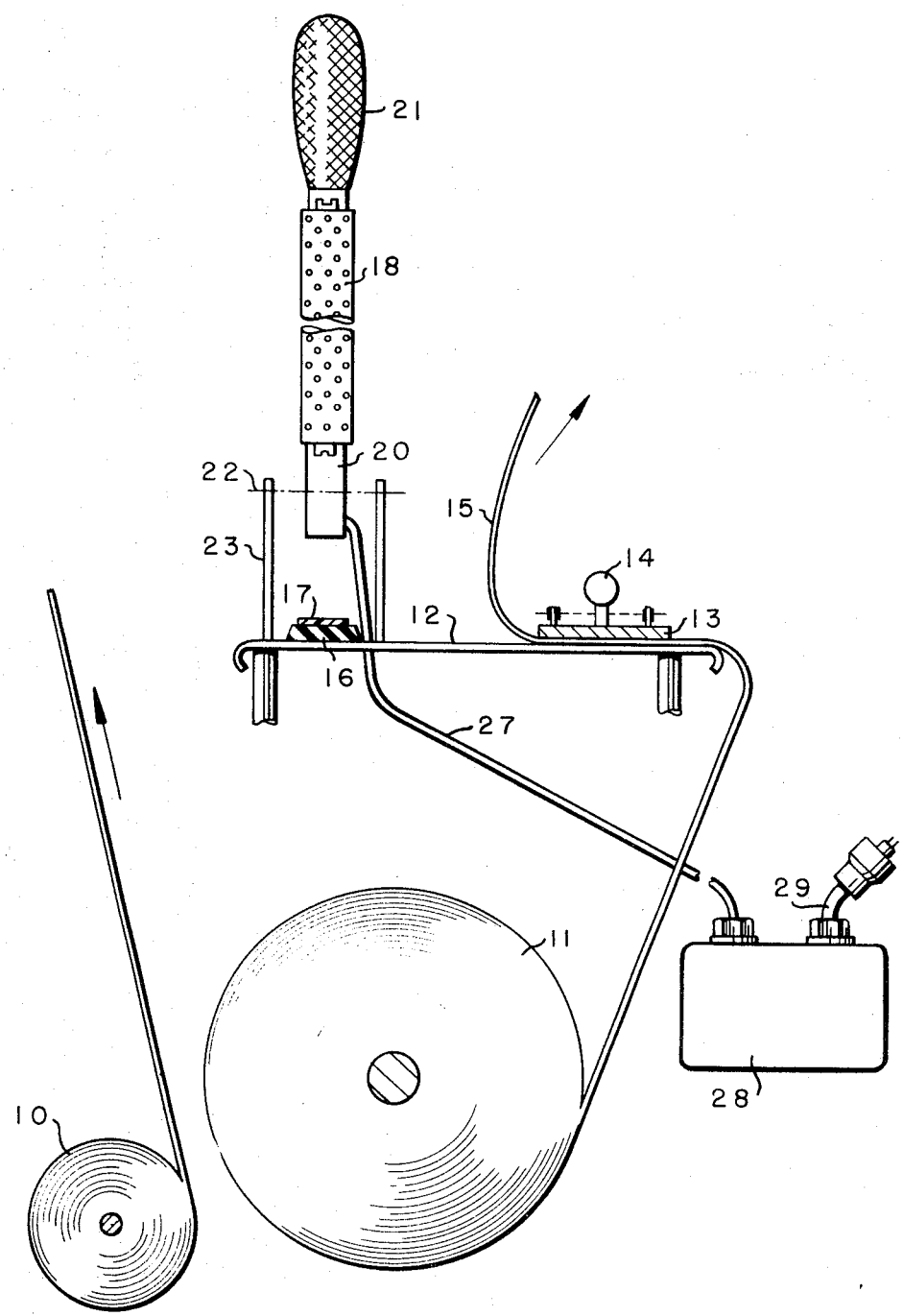
FIG.-2-

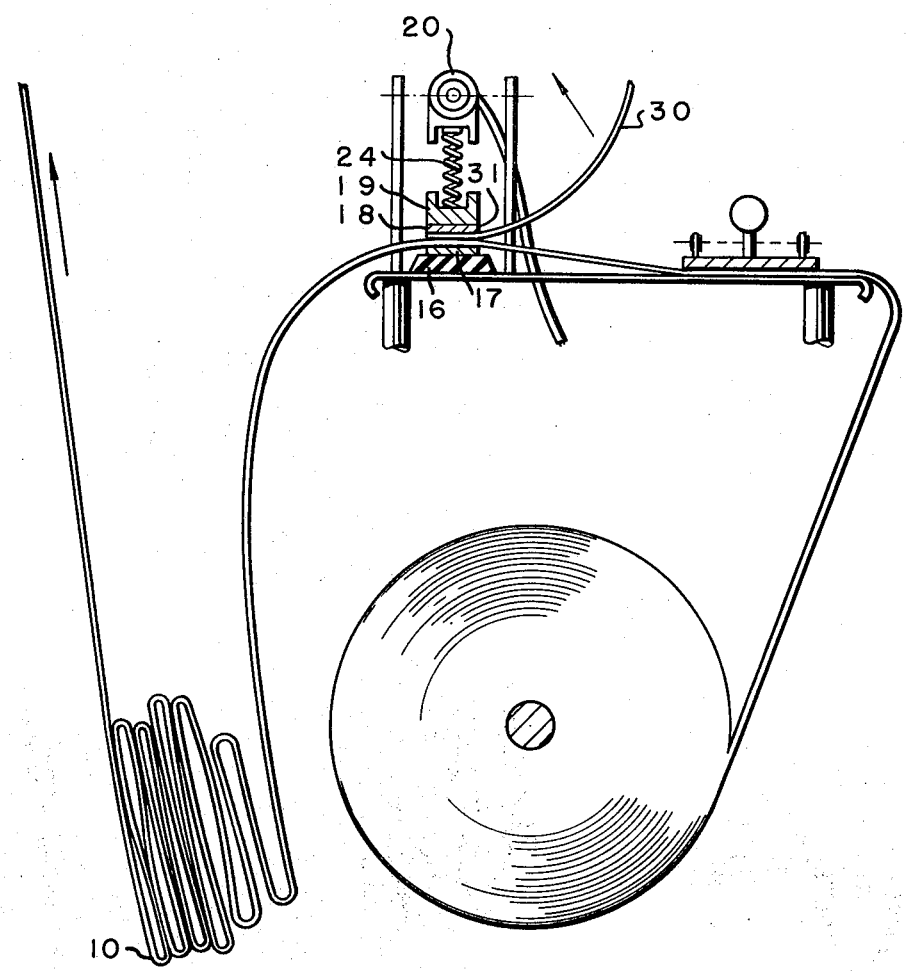

METHOD OF SPLICING TWO LAMINATED PACKAGING MATERIALS TOGETHER

This is a division of Application Ser. No. 625,673, filed Mar. 24, 1967, now abandoned.

This invention relates to a method of splicing two tearable, preferably web-shaped packaging materials of a laminated kind comprising a carrier layer, for instance, paper and/or aluminum, and a thermoplastic layer at least on the side intended to define the inside of the finished package. The invention also refers to an apparatus for carrying out the method.

The invention is more closely intended to be utilized for such packaging machines which operate with a web-shaped packaging material that is formed into a tube, the tube being longitudinally sealed and filled with a filling material and divided into individual packages by a sealing operation in sealing zones transverse to the tube axis. Particularly the invention is intended to be utilized for packaging machines of the above kind, which are provided to produce packages having sterile contents. As an example of packages in the production of which the invention can be utilized might be mentioned the well-known tetrahedron-shaped milk packages and especially aseptic packages of this kind. As a packaging material there is used for these and similar packages a laminate comprising a carrier layer and a plastic layer, the material being unwound from a supply roll. The carrier layer might consist of paper or aluminum or a combination of these materials. The plastic layer is coated on that side which in intended to define the inside of the finished package and provides for the necessary tightness of the package.

A feature of packaging machines of the kind working with a tube to which the filling material that is to be packed is continuously supplied, is that they have a typical continuous mode of action. Of course one may wish to maintain the continuity also during those occasions when a supply roll is finished and is to be replaced by a new one. It has, however, been difficult to realize this wish by previous splicing methods, according to which one has usually worked with a strip or tape which has been glued or welded over the splicing region. One object of the invention is therefore to provide a method of quickly and simply splicing two plastic coated materials, the splice in spite of the swiftness and simplicity of the method nevertheless fulfilling all those demands that might be raised upon its tightness and strength.

The invention is built upon the fact that one, when tearing a plastic-coated material, e.g., a plastic-coated paper and/or aluminum material, stretches (extends) the plastic material but not the carrier material. This observation or experience, in itself rather simple, has usefully been utilized in accordance with the invention, which is characterized in that first one of the two members that are to be jointed is torn against an abutment, the carrier material being torn substantially without plastic deformation in the tearing region, while the plastic coating when being torn is stretched, so that after the tearing operation, a rough plastic tongue caused by remaining plastic deformation will extend a distance past the edge of the torn carrier material; that hereupon the other member is overlappingly arranged with its plastic coated surface turned to the carrier layer of the said first member in the region of the said edge; and that hereupon the two members under the supply of heat are compressed in the region of the edge by means of a heating tool.

The invention will now be more closely described with reference to the accompanying drawings, in which FIG. 1 a–c schematically illustrate the principles of the invention, FIG. 1a herein showing an enlarged section of a material which has been torn according to the invention, FIG. 1b from above showing the same portion of the torn material, and FIG. 1c showing a section through a splice made in accordance with the invention;

FIG. 2 shows the initial moment of the operation according to the invention at a device for carrying out the method.

FIG. 3 shows a later moment of the process according to the invention, and

FIG. 4 shows a tool used at the carrying out of the method.

In FIG. 1a there is shown an edge portion of a laminated packaging material which has been torn against an abutment 5. The packaging material comprises a carrier lamina 1 of paper, aluminum or of a combination of such materials. Also other tearable materials of course are possible as carrier laminas. The only demand that might be raised for obtaining the desired result is that the carrier material can be torn substantially without remaining elongation. The carrier material 1 is at least on one side coated with a thermoplastic material, e.g., a polyethylene coating intended to define an inner surface in the finished package. Among other possible plastic materials might be mentioned polyvinyl acetate and polyvinyl copolymer. For obtaining a suitable elasticity it is suitable to mix the plastic with wax, preferably a paraffin wax.

When tearing the laminate against the abutment 5, FIG. 1a, the cellulose fibres of the carrier lamina 1 and, in the case when the carrier lamina also includes a metallic foil, also the metallic foil is torn substantially right off. During the tearing operation the abutment 5, which may consist of a steel band or a steel plate, is compressed against the carrier lamina of the material. The carrier lamina thus will serve as a protection of the underlaying plastic lamina 2 during this tearing operation. Partly as a result from this but primarily due to the greater toughness of the plastic material the plastic lamina will not be torn right off but will first be extended and not ruptured until its limit of stretching strain has been reached. As a result one will receive a substantially sharp edge 3 of the carrier lamina and a rough plastic tongue or "burr" 4 extending a distance of about one or a few millimetres beyond the edge 3. In places the plastic material might completely spring back, but, as it has been proved during the following heat-sealing operation, the plastic material within the zones where the plastic material has sprung back, will flow out considerably more willingly than in the case when the packaging material is cut off by means of a knife or a pair of scissors, it is obvious that the stretching nevertheless has affected the plastic material in a desired manner.

FIG. 1c shows the finished splice which has been obtained by the way that the end portion of the material to be spliced with the material which has been torn in the described manner is placed over the torn edge portion with its plastic coated surface 2' downwardly turned toward the said first carrier lamina 1. Hereupon the two materials are compressed uner the simultaneous supply of heat, whereby the plastic tongue or burr 4, FIG. 1a and b, unites with the plastic lamina 2'. As a result there is received an unbroken plastic layer and thus a tight splice to protect from leakage in the package made from the material in the splice region.

In FIG. 2 the initial moment is illustrated when slicing two web-shaped materials. In order to make the essential more clear, the illustrated details have only been shown schematically.

In the moment illustrated in the Figure an "old" supply roll 10 is still being unwound and the web-shaped plastic coated packaging material is fed in the direction indicated by the arrow into a packaging machine not shown.

At the same time the end portion of a new roll 11 of the same kind of material is prepared according to the principles which have been described with reference to FIGS. 1a and b. In the way apparent from the Figure, a portion of the roll 11 is unwound and placed upon a table 12 with the plastic coated surface of the material turned downward. A steel plate 13 which can be lowered and which is provided with a handle 14 is hereupon let down perpendicularly over the web. By pulling the excess material 15 in the direction of the arrow at the same time as one keeps the plate 13 tightly pressed against the underlaying packaging material one will, as a finish of this moment of the method, tear the material in accordance with the principles illustrated in FIGS. 1a and b, the steel plate 13 serving as an abutment.

On the front portion of the table 12, i.e, the portion nearest the not shown packaging machine, there is provided a sealing tool. This tool includes a counter action means in the shape of a rubber jaw 16 having an upper adhesion protecting layer of tetrafluoroethylene 17, which material is for sale under the trademark "Teflon."

The numeral 18 indicates a stamped heating-strip which is fastened to a heating-jaw 19, FIG. 3, which in its turn is resiliently mounted upon a pivotable bar 20 having a handle 21. The axis 22 of the bar 20 is mounted in two bearing brackets 23. The numeral 24 indicates a spring.

In FIG. 4 the construction of the sealing tool is illustrated more closely in a side view. From this figure it is apparent how a micro-switch 25 with an operation-button 26 is mounted on the heating-jaw 19 and how the switch 25 might be operated by means of the bar 20 therein that the spring 24 is compressed. By a suitable dimensioning of the spring 24 it is possible to obtain a well defined pressure at the operation of the switch 25.

To the switch 25 and the heating-strip 18 there are connected electrical conduits which via a cable 27 are connected to an electrical unit 28, FIG. 2.

The electrical unit 28 contains, i.e., a transformer and time-relay actuated by the switch 25 and is via a cable 29 connected to a 220 Volts system.

Returning to the description of the method, the excess portion had been torn off against the steel band 13. The operation is now continued therein that the band or plate 13 is raised and the torn material is advanced a short distance so that its edge will lie on the "Teflon" coating 17 of the counter-action means 16, whereupon the plate 13 is relowered whereby the material will be clamped in its position.

If the "old" roll 10 still contains rather much material, for a while no further step is taken. When the roll 10, however, has diminished so that it only contains rather little material one starts to unwound it completely. The unwound supply shall be able to satisfy the need of packaging material during the continued splicing operation.

The end portion of the "old" roll 10 is placed with its plastic lamina turned downward over the torn material which is arranged on the "Teflon" coating 17 in the manner apparent from FIG. 3 Numeral 30 indicates the end of the "old" roll. Further it is seen that the longitudinal edges of the two materials coincide. Immediately hereafter the handle 21 together with the heating-jaw 19 is lowered.

The handle is so strongly brought downward that the spring 24 is compressed and the bar 20 is forced to work upon the operation-button 26. This occurs at the moment when the power to compress the two packaging materials is desired. The actuation of the switch 25 thus occurs under a well defined pressure. As soon as the switch 25 has been switched on, a relay provided in the electrical unit 28 is actuated so that an electric current will flow through the heating-strip 18 during a time defined by the constants of the relay, whereby the strip is heated.

At the same time that the two materials are to be united are compressed between the heating-strip 18 and the "Teflon"-coating 17 and the splice is being established by the fusion of the plastic laminas, the extending end portion 30 is torn off and the edge 31 of the heating strip serves as an abutment.

The splice is now finished. The spliced material is removed from the table. FIG. 4 corresponds to a left hand view of the tool shown in FIG. 2 Finally the roll 11 is placed in a bearing bracket in the packaging machine.

It should be obvious that the invention might be varied within the scope and spirit of the following claims. Thus it is very well possible according to the principles of the invention to splice also materials which are plastic coated on both sides. In this case, however, also the heating-band should be coated with an adhesion preventing material as for instance "Teflon." Of course also the illustrated devices can be modified. At a projected machine one has for instance provided the calibrated spring in the counter-actinn jaw instead of the heating-jaw. It is also possible to design the heating-jaw 19 in such a way that it can serve as an abutment also for the tearing of the first material. During this moment of course no current is supplied to the heating-band. The patent applied for should thus not be restricted by the previous specification but only by the following claims.

What is claimed is:

1. A method of splicing two laminated packaging materials together, each of which has at least two layers of material, one of each of said layers being thermoplastic comprising the steps of: tearing one of the materials to sever the layers thereof, stretching the thermoplastic layer beyond the severed end of the material to provide a rough plastic tongue, placing a second laminated material having a thermoplastic layer on top of the severed material with the thermoplastic layer of the second material facing the rough plastic tongue and heat sealing the rough plastic tongue to the thermoplastic layer of the second material.

* * * * *